(No Model.) 7 Sheets—Sheet 2.
E. F. LEWIS.
MACHINE FOR MAKING WIRE NAILS.

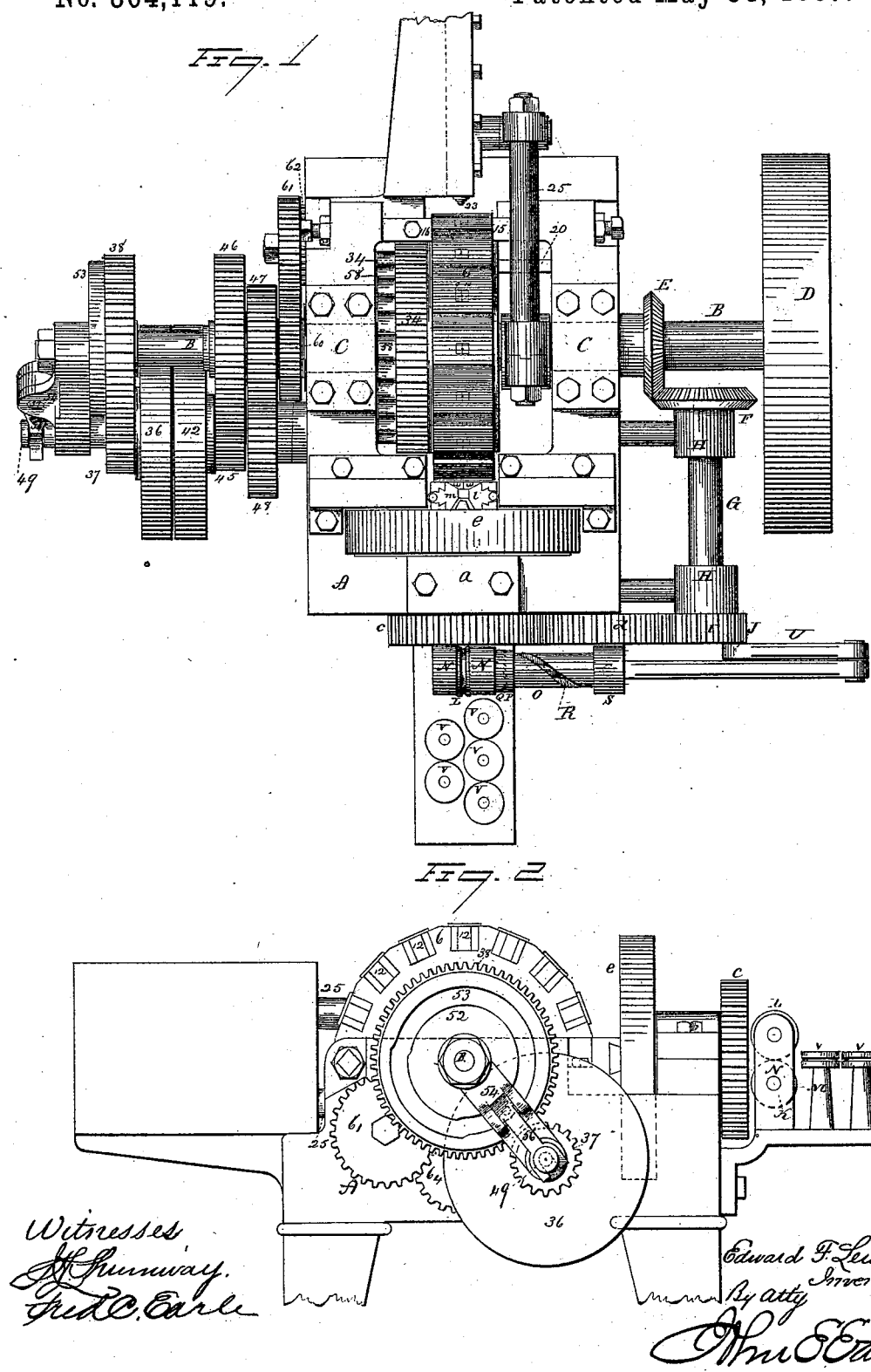

No. 364,119. Patented May 31, 1887.

Witnesses,
H. Shumway
Fred C. Earle

Edward F. Lewis
Inventor
By atty John E. Earle (No Model.) 7 Sheets—Sheet 3.
E. F. LEWIS.
MACHINE FOR MAKING WIRE NAILS.
No. 364,119. Patented May 31, 1887.
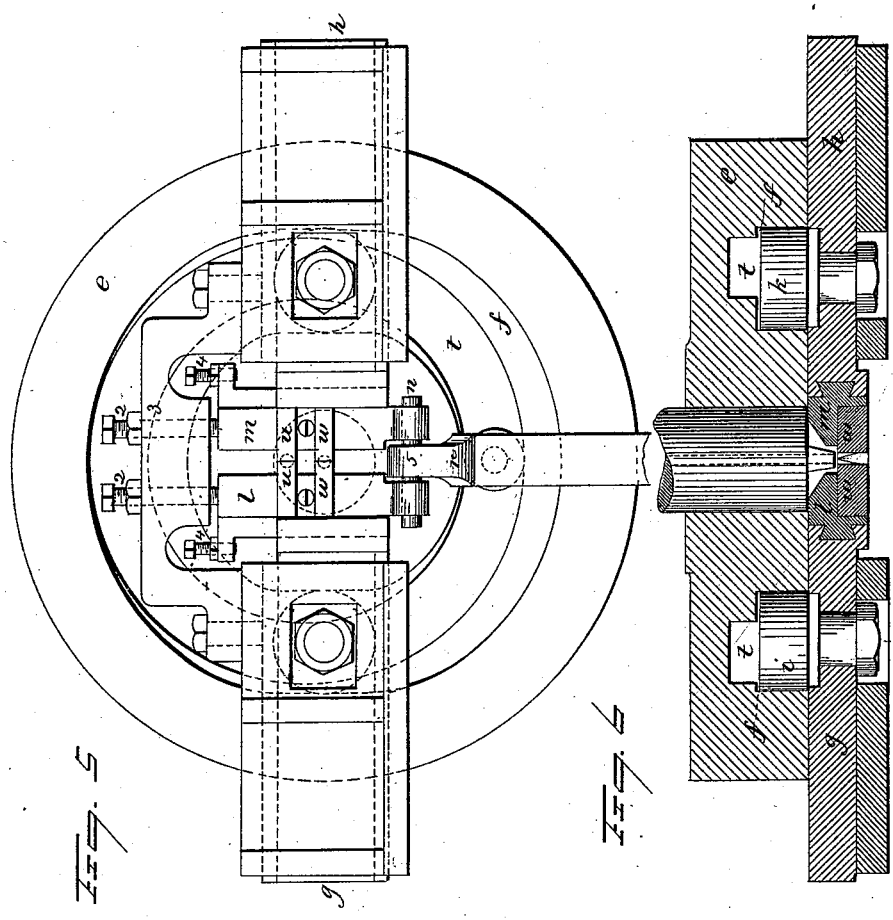

(No Model.) 7 Sheets—Sheet 4.
E. F. LEWIS.
MACHINE FOR MAKING WIRE NAILS.

No. 364,119. Patented May 31, 1887.

Witnesses
J. H. Shumway
Fred C. Earle

Edward F. Lewis, Inventor.
By Atty
John C. Earle (No Model.) 7 Sheets—Sheet 5.
E. F. LEWIS.
MACHINE FOR MAKING WIRE NAILS.
No. 364,119. Patented May 31, 1887.
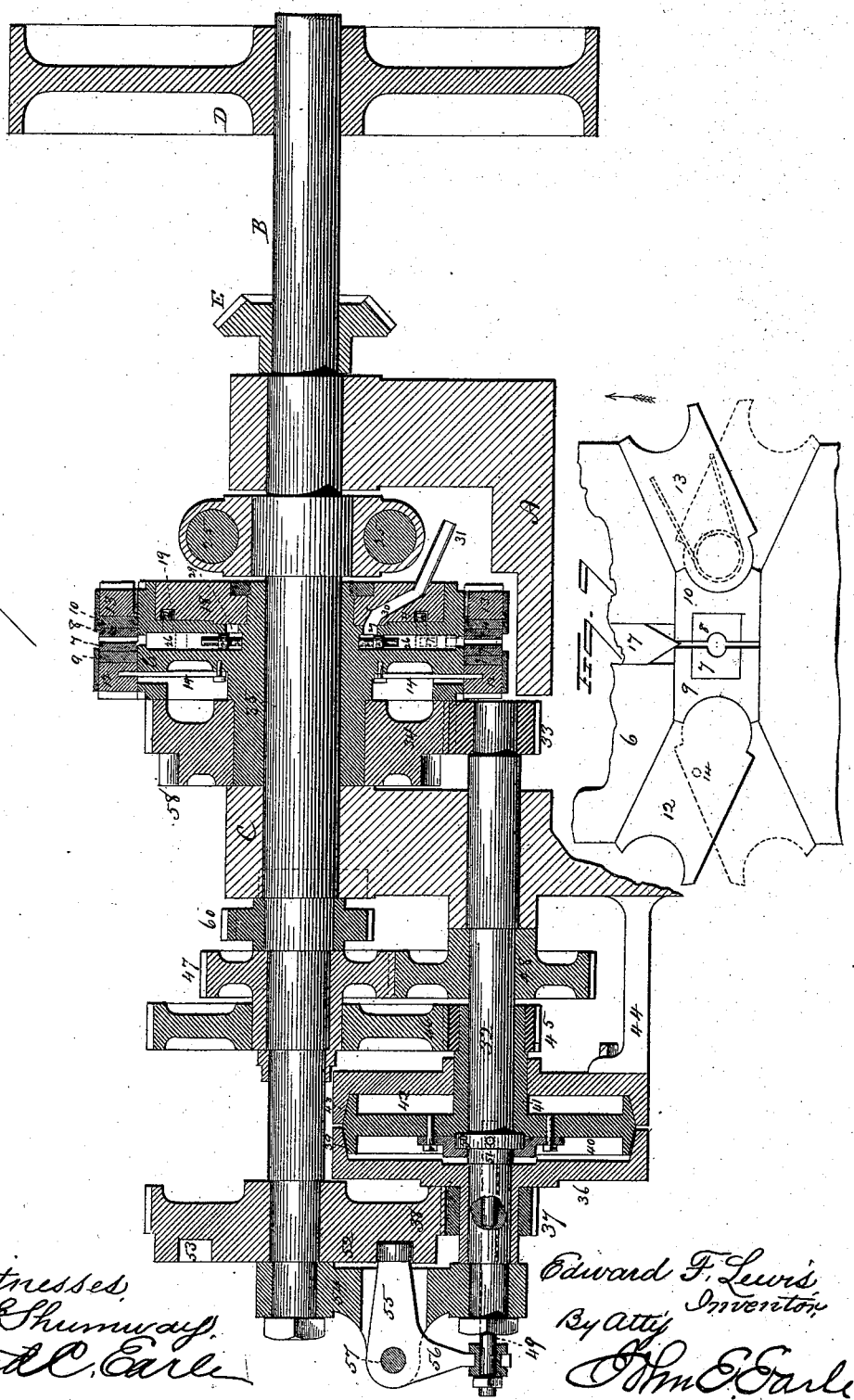

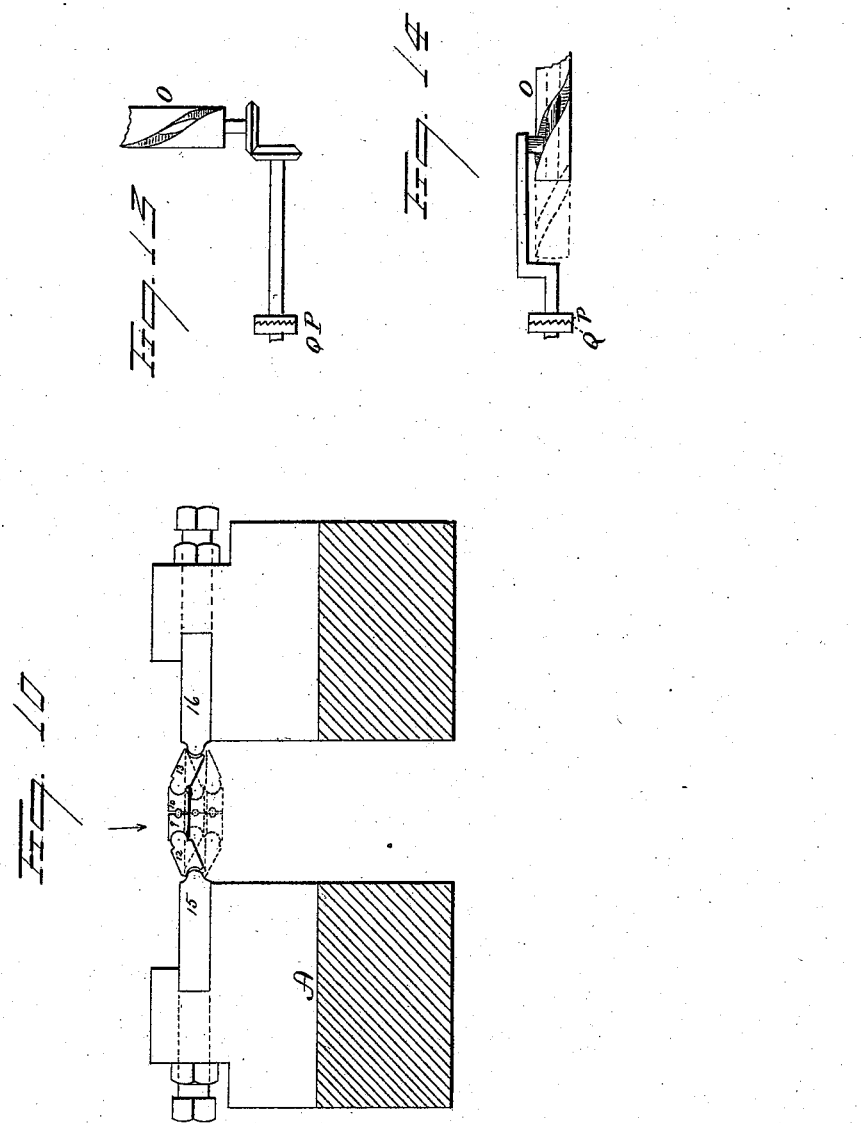

(No Model.)
7 Sheets—Sheet 7.
E. F. LEWIS.
MACHINE FOR MAKING WIRE NAILS.
No. 364,119. Patented May 31, 1887.
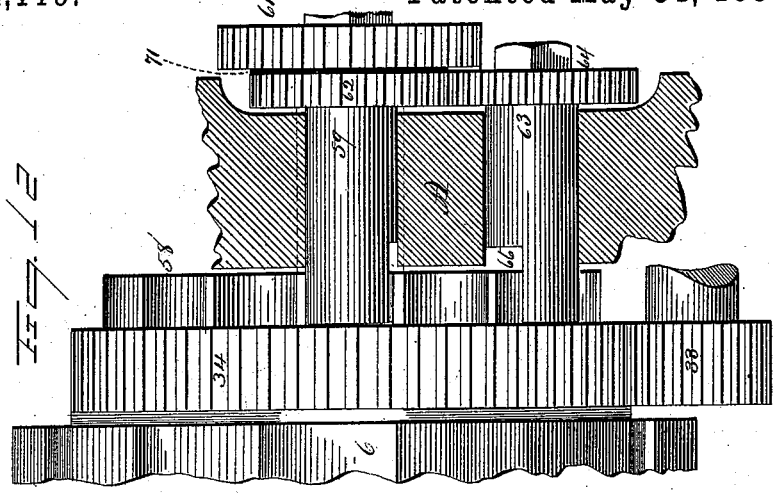
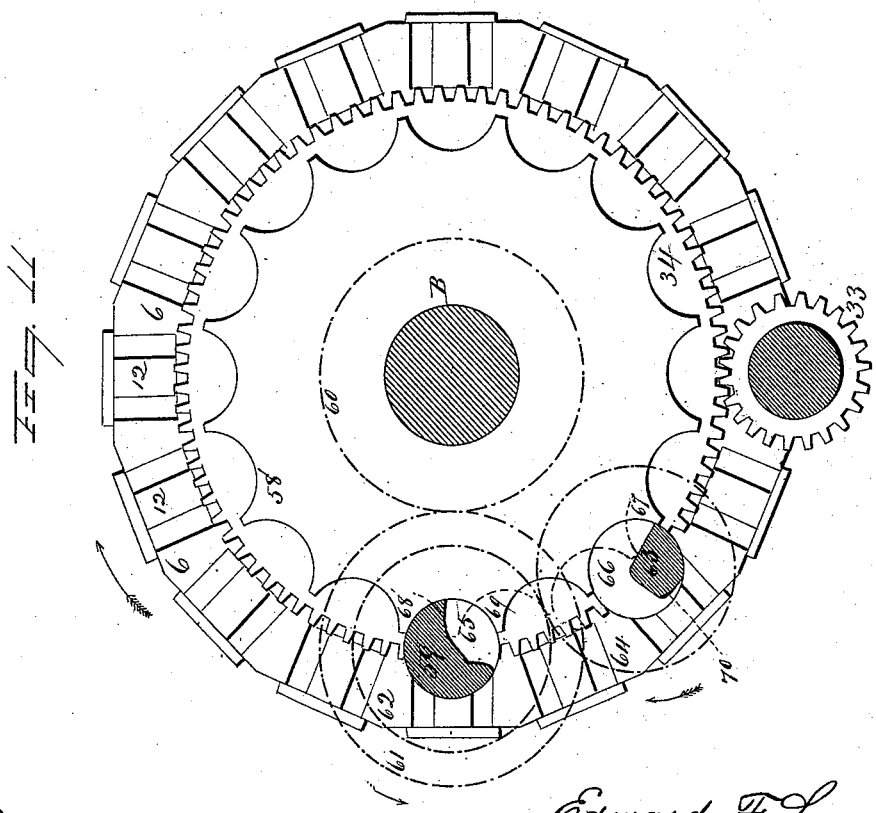
Witnesses,
H. Shumway.
Fred C. Earle.
Edward F. Lewis,
Inventor,
By Atty

UNITED STATES PATENT OFFICE.

EDWARD F. LEWIS, OF WATERBURY, CONNECTICUT.

MACHINE FOR MAKING WIRE NAILS.

SPECIFICATION forming part of Letters Patent No. 364,119, dated May 31, 1887.

Application filed October 4, 1886. Serial No. 215,229. (No model.)

*To all whom it may concern:*

Be it known that I, EDWARD F. LEWIS, of Waterbury, in the county of New Haven and State of Connecticut, have invented a new Improvement in Machines for Making Wire Nails; and I do hereby declare the following, when taken in connection with accompanying drawings and the letters of reference marked thereon, to be a full, clear, and exact description of the same, and which said drawings constitute part of this specification, and represent, in—

Figure 3:
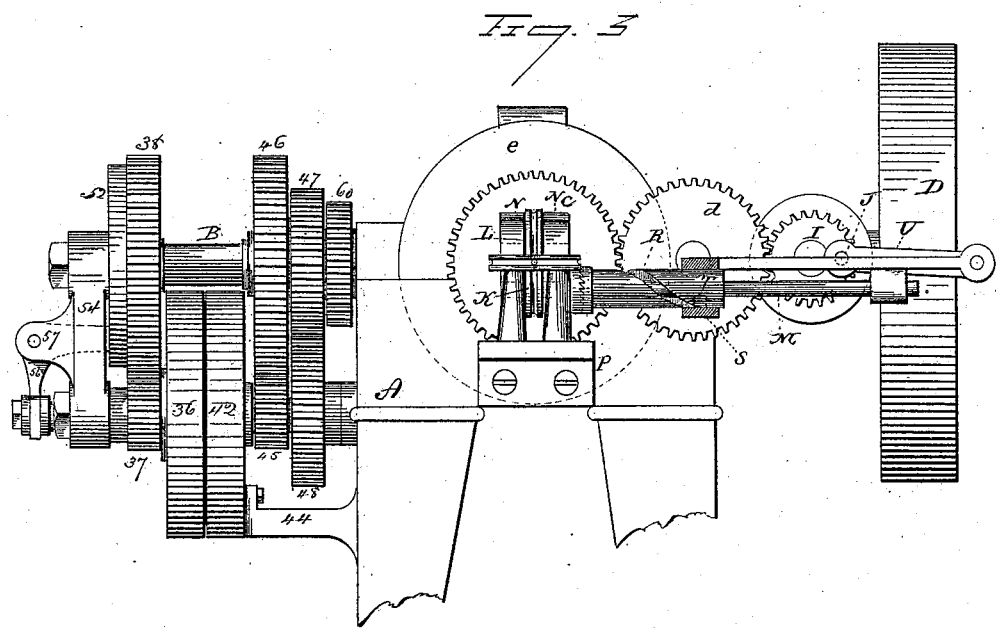
Figure 4:
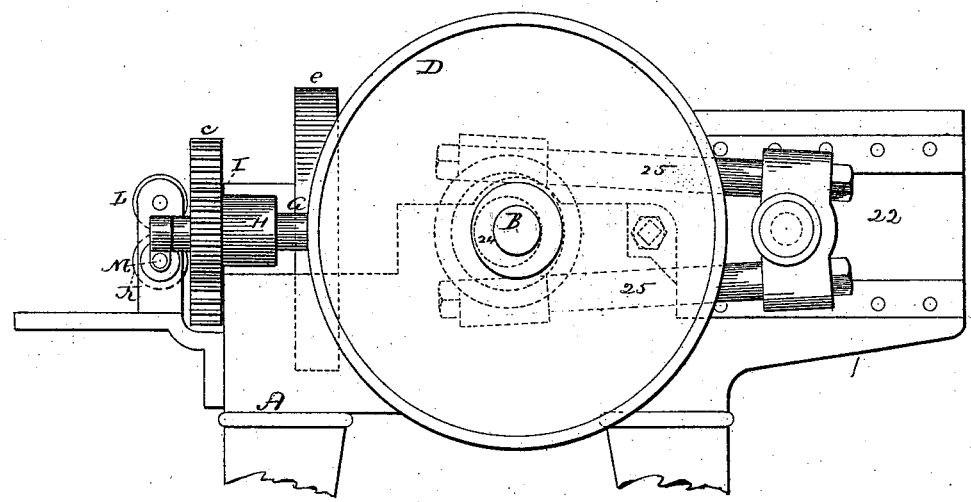
Figure 7:
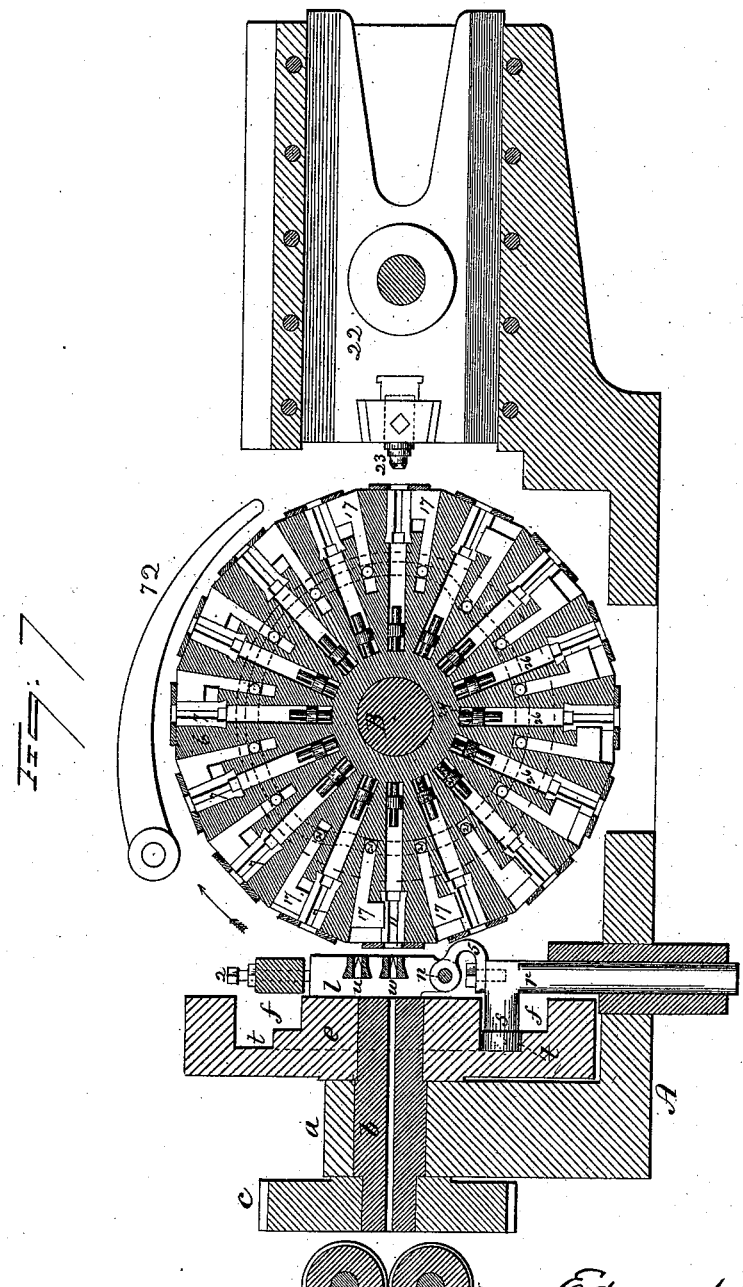

Figure 1, a top or plan view of the machine complete, with the guard 72 removed; Fig. 2, an end view looking from the left of Fig. 1; Fig. 3, an end view, looking from right of Fig. 2; Fig. 4, an end view looking from the right of Fig. 1; Fig. 5, an inside view of the cutting devices detached and enlarged; Fig. 6, a horizontal section of the cutting device, also enlarged; Fig. 7, a section cutting through the disk at right angles to the axis of the driving-shaft, enlarged; Fig. 8, a longitudinal central section, enlarged; Fig. 9, a face view of a portion of the carrying-disk, showing the holding-dies and toggle, still further enlarged; Fig. 10, a partial section showing the fixed cams by which the toggle is operated to close the holding-dies; Fig. 11, a side view of the disk detached, and showing the dogs for locking the disk in its positions of rest; Fig. 12, a partial longitudinal section of the locking devices. Figs. 13 and 14 represent modifications in the feed.

This invention relates to an improvement in machines for making that class of nails which are produced from wire blanks, one end pointed, the other upset to form the head, and such as commonly known as "wire nails," the object of the invention being to construct an automatic machine which will receive the wire and complete and deliver the nails in a very rapid manner.

A represents the bed, which is supported upon legs or otherwise, and upon which the operative mechanism is arranged; B, the driving-shaft, arranged longitudinally above the bed in bearings C C, and so as to revolve freely therein, power being applied to the shaft through a pulley, D, or otherwise. Fixed to the driving-shaft B is a bevel-gear, E, which works into a corresponding bevel-gear, F, on a counter-shaft, G, supported in bearings H H, and at right angles to the shaft B. The shaft G carries a spur-gear, I, and which also forms a crank, J, from which the feed of the wire to the machine is derived. The feed consists of a pair of grooved rolls, K L, one arranged above the other, as seen in Figs. 3 and 7, the groove in the periphery of the rolls corresponding to the diameter of the wire to be used. The one roll, K, is fixed upon a shaft, M, which extends parallel with the plane of the gear I and supported in bearings N N.

Between the bearings and the spur-gear I a sleeve, O, is arranged loose upon the shaft. This sleeve has formed upon it a collar, P, and on the shaft K a like collar, Q, is fixed. The adjacent faces of the two collars are constructed with teeth, as seen in Fig. 3, the teeth presenting a square shoulder to each other in one direction, but beveled in the opposite direction, and so that if the sleeve be forcibly revolved in the direction of the square shoulders the shaft K will be turned with it; but if the sleeve O be turned in the opposite direction, then the beveled or inclined sides of the teeth will escape from each other and the sleeve be free to revolve without imparting rotation to the collar Q, and thence to the roll K thereon.

The sleeve O is constructed with a spiral groove, R, in its surface, and on the sleeve is a slide, S, arranged to work longitudinally thereon, and in the slide is a stud, T, as seen in broken lines, Fig. 3, which enters the groove R in the sleeve O. Longitudinal reciprocating movement is imparted to the slide S by the crank J, through a connecting-rod, U, so that at each revolution of the gear I a full reciprocating movement is imparted to the slide S over the sleeve O. Moving in one direction, the slide S, through its connection with the spiral groove R in the sleeve O, imparts to the sleeve O a rotative movement in one direction, and as the slide returns it imparts a corresponding reverse rotative movement to the sleeve; hence, wire being introduced between the two rolls K L, the rolls impinging with force upon the wire, the rotation of the sleeve in one direction will impart corresponding rotation to the roll K and advance the wire. Then on the return the teeth of the collar P will escape from the teeth of the collar Q, the feed-rolls will remain stationary, while the sleeve returns. Therefore at each advance rotation of the sleeve a corresponding feed of wire is produced, and the length of the wire fed will correspond to the extent of rotation imparted to the rolls or to the diameter of the rolls; and this may be adjusted by proportioning the throw of the crank or making the pitch of the spiral groove in the sleeve or the diameter of the feed-rolls accordingly.

A straightening device may be arranged near the feed-rolls, so that the wire may be straightened as it passes to the machine. I illustrate a common and well-known straightener, consisting of several rolls, V, arranged alternately upon opposite sides of the wire, and between which the wire runs. (Not necessary to be particularly described.) This feeding device, while specially adapted to my improved nail-machine, is applicable to many of the machines employed in working wire.

In representing the spirally-grooved sleeve as in direct connection with the feeding-roll, and whereby intermittent rotation is imparted to the roll by the back and forward rotation of the spirally-grooved sleeve, I do not wish to be understood as limiting this part of the invention to this particular arrangement of the spiral groove and the feed-rolls, as the spirally-grooved cylinder may be at a distant point and connected with the feed rolls by gears, as seen in Fig. 13, should the nature of the application of the feeding device require such a modification in the relative arrangement of the spirally-grooved cylinder, its slide or nut, and the feed-rolls. It will be evident that the same result will be attained by imparting the reciprocating movement to the spirally-grooved cylinder and hold it so as to prevent its rotation, the nut being made a part of the actuating-collar, as in Fig. 14.

One great advantage of the feeding device which I have described over many other intermittent feeding devices for wire is that I am enabled to graduate the extent of feed without changing the rolls, the reciprocating movement being produced by a crank, the throw of which may be readily adjusted to give a greater or less extent of reciprocating movement to the sleeve and a proportionately greater or less extent of rotation to the feeding-rolls.

In a bearing, $a$, in the bed a shaft, $b$, is arranged, (see Fig. 7,) the axis of which is in line between the feed-rolls K L. This shaft is tubular, and so that the wire drawn inward by the rolls K L will pass concentrically through the shaft $b$. On this shaft is a spur-gear, $c$, in the plane of the gear I, and between the gear I and the gear $c$, working into both, is a gear, $d$, through which a constant revolution is imparted to the shaft $b$ from the driving-shaft. At the inner end of the shaft $b$ is a cam, $e$, on the inner side of which is a cam-shaped groove, $f$, (see Figs. 5 and 7,) and inside this cam two horizontal slides, $g$ $h$, are arranged parallel with the inner face of the cam $e$, as seen in Fig. 6.

On the slide $g$ is a stud, $i$, (represented as an anti-friction roller,) and which extends into the groove $f$ in the cam $e$, on one side of its axis, and on the slide $h$ is a like stud, $k$, which extends into the same groove upon the opposite side of the axis, and as seen in Fig. 6. The groove $f$, as seen in Fig. 5, is a double-acting groove of equal capacity, and so that as the cam $e$ revolves it will impart a corresponding inward movement to the two slides $g$ $h$ and a corresponding return or outward movement to the two slides, the movements being simultaneous.

At the inner end of the slide $g$ a vertical slide, $l$, is arranged and guided, and upon the inner end of the slide $h$ is a like vertically-guided slide, $m$. These two slides $l$ $m$ extend downward, and are connected by a cross-head, $n$, on a vertical slide, $r$. (See Figs. 5 and 7.) From this slide $r$ a stud, $s$, extends into a cam-shaped groove, $t$, also made in the face of the cam $e$ and in the bottom of the groove $f$, the width of the groove $t$ being so much narrower than that of the groove $f$ as to permit such arrangement. This groove $t$ is a single-acting cam-groove, so that at each revolution of the cam a vertically-reciprocating movement will be imparted to the two slides $l$ $m$, while the horizontal reciprocating movement is imparted to the said two slides $l$ $m$ by their respective carrying-slides $g$ $h$.

The relative time of the action of the cam upon the horizontal and vertical slides is such that the upward movement of the slides $l$ $m$ occurs before the complete inward movement of the two slides $g$ $h$, and the shape of the cam-grooves is such that the slides $l$ $m$ remain stationary as to their vertical position while the slides $g$ $h$ are completing their inward movement and commencing their outward movement.

In the vertical slides $l$ $m$ two pairs of dies, $u$ and $w$, are arranged, one above the other, and distant from each other, so that when the two slides $l$ $m$ are in their up position, as seen in Figs. 5 and 7, the lower dies, $w$, will stand in line with the opening through the shaft $b$, and so that when in the down position the dies $u$ will stand in a position in line with the opening through the shaft $b$. The faces of the two pairs of dies $u$ $w$ are constructed with recesses forming cutters corresponding to the shape of the point of the nail to be made, as indicated in Fig. 7, and so that as the wire passes through between the dies standing in line with the wire, and the dies are brought together upon the wire, they will cut off the wire and give to the advancing end a shape corresponding to the point required for the nail. After the first point has been cut—say by the dies $w$—the dies open, as before described, and permit the wire to be fed in between them, and while this is being done the slides $l$ $m$ descend and bring the dies $u$ into active position, and in their turn the said dies $u$ are brought together and cut the wire, so as to form the point, as before described, for the dies $w$; then, the dies opening, the wire again advances, the slides $l\ m$ rise and bring the dies $w$ again into action, and so continuing the dies alternate in their operation—first one pair cuts off the point and then the other pair. The special object of this alternate action of the dies is to increase the cutting capacity; for if the machine be worked as rapidly as may be without heating the dies it necessarily follows that the alternate action of the cutting-dies doubles the capacity of the machine over what it would possess were there but a single pair of cutting-dies.

To insure the positive position of the cutting-dies, a set-screw, 2, is arranged in a frame, 3, above the slides $l\ m$, against which the slides will bear when in the up position to present the dies $w$. To stop the slides in the descent, a set-screw, 4, is arranged in an overhanging projection from the respective slides, the said screws adapted to strike the upper edge of their respective slides $g\ h$ when the slides $l\ m$ descend and arrive at a point to bring the dies $u$ into position.

As the cam will impart a positive up and down movement to the slides $l\ m$, and as the adjustment of the set-screws 2 2 and 4 4 would to some extent vary the position of the slides $l\ m$, I make the connection between the crosshead and the slide $r$ in the form of a spring, 5, (see Fig. 7,) the strength of the spring being sufficient for the movement of the slides, yet so as to yield for the adjustment of the slides $l\ m$.

Like the feeding device before described, the cutting device which I have described is applicable to other wire-working machines.

Loose upon the driving-shaft B is a disk, 6, and so that it may revolve in a plane at right angles to the shaft B, and parallel with the axis of the shaft $b$, said disk standing in the plane of the axis of the shaft $b$, (see Fig. 7,) the axis of the shaft B and of the shaft $b$ being in the same plane. The opening through the shaft $b$ is in a diametrical line through the disk 6, as seen in Fig. 7. This disk forms the carrier to receive the blanks fed into the machine and cut off, as before described, and transfer them to the heading device. In the periphery of the disk 6 a series of holding-dies are arranged equidistant from each other, as seen in Fig. 7. Each of the holding-dies is composed of two parts, 7 8, as seen in Fig. 9. These dies are arranged in slides, respectively, 9 and 10, in a recess in the periphery of the disk, and in the adjacent faces of the two parts 7 8 is a radial groove, together corresponding to the wire blank from which the nail is to be formed.

As the wire is fed through the cutting-dies, as before described, it enters between the holding-dies in the disk, which at the time stand directly in line therewith, say 11, as seen in Fig. 7. The distance between the face of the holding-dies and of the cutting-dies is such that the wire will be cut off, leaving its end projecting outside the dies sufficiently far at least to afford metal for the formation of the head. At the time the wire thus enters into the holding-dies the dies are held together only by the action of a spring, and so as to produce frictional contact with the blank to hold it in place for transfer.

The slides 9 10, which carry the holding-dies, are supported in a transverse recess in the periphery of the disk 6, and so as to be movable toward and from each other. Outside the slide 9 one part, 12, of a toggle is arranged, hung to the slide 9, and upon the outside of the slide 10 is a second part, 13, of the toggle. These parts of the toggle are arranged to swing upon an axis radiating from the axis of the disk 6, there being a recess formed in the disk to permit the swinging movement of the two parts of the toggle from one extreme to the opposite, as indicated in broken lines, Fig. 9. The normal position of the two parts of the toggle is at one extreme, as seen in Fig. 9—that is, resting in the side of the recess toward which the disk is revolving, the arrow, Figs. 7 and 9, indicating the direction in which the disk revolves.

The one part, 13, is provided with a spring, (indicated in broken lines,) the tendency of which is to hold that part of the toggle in its normal position, but yet permit it to be turned to the opposite extreme. The other part, 12, is provided with a radial spring, 14, fixed to the disk and extending up into the toggle. The tendency of this spring is to yieldingly force the slide 9 toward the slide 10 and to yieldingly hold the part 12 of the toggle in its normal position, as seen in Fig. 9. The outer ends of the toggle extend outside the respective sides of the disk, as also seen in Fig. 9.

At the point where the heading is to be performed—and here represented as diametrically opposite the point where the blank is to receive the toggle—stationary cams 15 and 16 are arranged, one each side of the disk, as seen in Figs. 1 and 10. These cams stand in the path of the outer ends, respectively, of the parts 12 and 13 of the toggle, and so that as the disk revolves the toggles in their normal position reach the cams 15 and 16, as seen in Fig. 10. The cams engage the outer ends of the toggles and prevent their advance with the disk. The disk continuing, the parts 12 and 13 are turned from their oblique position into a direct straight line, as indicated in broken lines, Fig. 10, which rigidly and firmly closes the holding-dies upon the blank, and so as to hold the blank that the projecting end may be upset on the outer face of the dies to form the head. After the heading is performed the disk continues its movement, and in so doing the parts 12 and 13 turn to the opposite extreme, as indicated by broken lines, Fig. 9, and then escape from the cams 15 and 16, as in broken lines, Fig. 10. After they have so escaped the parts 12 and 13 return, under the action of their respective springs, to their normal position, and the dies are released to such an extent as to permit the easy entrance of the blank when next the holding-dies are presented at the receiving-point.

Under the action of their respective springs the holding-dies will be closed, so that more or less force will be required to introduce the blanks.

To mechanically open the holding-dies as they come into the receiving position, so that the entrance of the blank may be entirely unobstructed, I arrange in the disk a sliding cam, 17, for each pair of dies, as seen in Fig. 7. The path of these sliding cams is inclined to the radial line of the holding-dies, as seen in Fig. 7. The edge of the sliding cam is wedge-shaped, as seen in Fig. 9, its apex in the plane of the division between the two parts 9 10. Upon one side of the disk 6 is a stationary disk, 18, in the inner face of which is a cam-groove, 19. This disk 18 is concentric with the disk 6, but prevented from rotation by a connection, 20, with the frame. (See Fig. 1.)

From each of the slides 17 a stud, 21, projects laterally into the cam-shaped groove 19 of the stationary disk 18. This cam groove is represented in broken lines, Fig. 7, and it is of such shape that as the holding-dies reach the receiving position the slide will have been drawn inward, as seen in Figs. 7 and 9, and because of its inclined path with relation to the axis of the holding-dies the wedge-shaped edge of the slide is forced in between the slides 9 and 10, and separates those slides accordingly; but as the disk moves to take the holding-dies from the receiving position the groove in the cam turns outward, as seen in Fig. 7, and so as to force the cam-slide 17 outward and permit the slides 9 and 10 and their holding-dies to come together and grasp the wire under the action of the holding-die springs. From this point the cam-groove is concentric with the axis of the disk around to a point beyond the heading position, so that the holding-dies remain in their closed position, under the action of the springs, until they have passed beyond the heading operation. Arriving at this point beyond the heading operation, the groove in the cam is curved inward, so that as the "cam-slides" 17 pass this point they are drawn inward, and so as to open the holding-dies, in order that the headed nail may be removed from the holding-dies; and after this opening occurs the groove is concentric with the axis of the disk around to a point near the receiving position, where it turns outward, as shown, and as before described.

The heading device consists of a slide, 22, arranged to work in a plane parallel with the plane of the carrying-disk, and, as here represented, is diametrically opposite the receiving-point, as seen in Fig. 7. This slide carries the heading-tool 23. It receives a reciprocating movement from an eccentric, 24, on the driving-shaft B, (see Fig. 4,) there being a pitman, 25, extending from the eccentric into connection with the slide, as seen in Figs. 1 and 4, this being a positive reciprocating movement. As the blank is presented to the heading-tool the disk rests, as before described, and the heading-tool advances, upsets the metal to form the head, and then retreats, leaving the disk to pass on and present the next blank. The holding-disk receives an intermittent movement, and so as to successively present the numerous holding-dies which it carries to the receiving-point, and also to the heading-tool, and the disk, advancing step by step at each rest, receives one blank and presents another to the heading-tool. After heading, the disk advances, the holding-dies are opened, as before described, and the blank may fall therefrom by its own gravity; but in order to insure a positive discharge of the headed nail I construct the disk with radial holes 26 in line with the holding dies, and of a diameter greater than the diameter of the largest nail to be made. These holes form tubes or cylinders, in each of which is a piston, 27, adapted to work freely therein. The piston has an extension, 28, of smaller diameter upon its inner end, which may strike the inner end of the cylinder, and so as to prevent the piston from passing to the extreme inner end of the cylinder.

Near the inner end of each cylinder is a lateral opening, 29, against the stationary disk 18, (see Fig. 8,) and so that the several openings are closed by the said stationary disk; but at one point in the revolution of the disk the openings 29 will be successively brought to register with an air-passage, 30, through the disk 18. To this passage an air-tube, 31, communicates a blast of air, which may be received from a blower or any suitable device for imparting a blast. When the opening 29 registers with the passage 30, the air-blast is permitted to enter the cylinder upon the inner end of the piston, and this blast is of sufficient force to throw the piston outward, as indicated in broken lines, Fig. 8, at the bottom. The point where this air communication is made should be upon the under side of the disk—say as indicated by the broken lines, Fig. 7—and while the cylinder is in a downward vertical position. As the blank is introduced its inner end will strike the piston and force it inward. Then after heading, and when the disk is turned so far as to bring the opening 29 to register with the air-passage, the blast of air introduced will force the piston outward, as before described, and in such movement of the piston the finished nail will be ejected. If, therefore, the nails should stick in the holding-dies so as not to fall from the holding-dies by their own gravity, as before described, the piston will insure their ejection.

To impart the intermittent rotation to the carrying-disk, a counter-shaft, 32, is arranged in suitable bearings in the bed parallel with the driving-shaft B. On this shaft a pinion, 33, is fixed, which works into a corresponding gear, 34, fixed to the hub 35 of the carrying-disk 6, as seen in Fig. 8. This shaft 32 extends through the frame, and loose upon it is a concentric disk, 36, upon the hub of which, or made as a part of the disk, is a pinion, 37, into which a gear, 38, fixed to the driving-shaft B, works, so that a constant rotation is imparted to the disk 36. The disk 36 is constructed with a concentric flange, 39, beveled outward. Adjacent to the flanged side of the disk 36 is a second disk, 40, loose upon the shaft, free to revolve, and also free for a certain amount of longitudinal movement independent of the shaft 32.

On the hub 41 of the disk 40 a concentric disk, 42, is arranged parallel with the disks 36 and 40, the disk 42 having upon its face, adjacent to the disk 40, a concentric flange, 43, the inner face of which is beveled outward—that is, in reverse direction to the bevel of the flange 39 of the disk 36. The periphery of the disk 40 is beveled from the center in both directions corresponding to the internal bevels of the flanges 39 and 43.

The disk 42 is supported in a stationary position—say as by a bracket, 44, extending from the bed of the machine. (See Fig. 3.) Hence, if the disk 40 be drawn into engagement with the revolving disk 36, it will receive the revolution of the disk 36, because of frictional contact. On the contrary, if it be forced in the opposite direction and into the disk 42, to make frictional contact therewith, then the revolution of the disk 40 will be prevented, because the disk 42 is stationary. This combination of disks is a common and well-known friction clutch, and it will be understood that for it there may be substituted any of the known equivalent clutches whereby the revolving and stationary conditions may be attained.

On the hub 41 of the disk 40 a pinion, 45, is fixed so as to revolve with the disk 40. This pinion works into a gear, 46, fixed to another gear, 47, which is loose upon the driving shaft B, so that the rotation of the pinion 45 is communicated to the gears 46 and 47. The gear 47 in its turn works into a gear, 48, fixed to the shaft 32, so that the rotative movement of the disk 40 is communicated to the shaft 32 through the pinion 45, the gears 46, 47, and 48. The outer end of the shaft 32 is made tubular, and in it is a longitudinally-movable spindle, 49, which extends through the outer end, and inward extends to a position within the disk 40. Around the shaft 32, within the disk, is a concentric collar, 50, free for longitudinal movement. Through a slot in the shaft a pin, 51, extends from spindle 49 into connection with the collar 50. The collar 50 is embraced by the disk 40, so that any longitudinal movement imparted to the collar will be imparted to the disk 40.

Fixed to the driving-shaft—and here represented as a part of the gear 38—is a cam, 52, in the outer side of which is a groove, 53. (See Figs. 2 and 8.) Outside the cam 52 a bracket, 54, is arranged—here represented as supported upon the ends of the shafts B and 32. In this bracket is a bell-crank lever, 55 56, hung upon a fulcrum, 57. The one arm, 55, (see Fig. 8,) extends into the groove of the cam 43, and so that in the revolution of the cam the irregularities of the groove will cause a corresponding vibration of the bell-crank lever. The other arm, 56, of the bell-crank lever engages the spindle 49, so that the vibratory movement imparted to the lever will impart a corresponding reciprocating movement to the spindle 49 and to the disk 40.

As I have represented the machine the disk carries sixteen holding-dies, and therefore requires sixteen intermittent steps to the full revolution. The gearing between the counter-shaft 32 and the carrying-disk is four to one. The groove in the cam 52 is such as to depress the arm 55 of the bell-crank lever during one-fourth of its revolution, and while the bell-crank lever is thus held the disk 40 will be drawn into engagement with the constantly-revolving disk 36, and during that engagement the revolution of the disk 36 will be imparted to the shaft 32, and consequently to the carrying-disk; and because of the gearing, as before mentioned, such movement of the carrying-disk will be one-sixteenth of its revolution. During the remainder of the revolution of the cam 52 the bell-crank lever is turned in the opposite direction, so as to force the disk 40 into engagement with the stationary disk 42. Consequently during that time the disk 40 will be held stationary, together with the carrying-disk, so that, as represented, the carrying-disk revolves one step during one-fourth of the revolution of the driving-shaft, but remains stationary during the remaining three-fourths of the revolution of the driving-shaft, and in this three-fourths time the feeding and heading occur, the several cams or devices for actuating the feeding and heading devices being made accordingly.

It will be understood by those skilled in automatic machinery that the extent of revolution of the disk, as well as the times of movements, may be changed to suit circumstances.

It is desirable that the disk should be positively brought to and held in its positions of rest, and this should be done when the clutching device is of the frictional character which I have described.

To lock the disk in its positions of rest, I arrange a wheel, 58, in connection with the disk, and, as here represented, the wheel is made as a part of the gear 34, through which the rotative movement is imparted to the carrying-disk.

In the periphery of the wheel 58 are a series of recesses parallel with the axis, the recesses being of segment shape, as shown, thus forming a toothed wheel.

Parallel with the axis of the driving-shaft B is a shaft, 59, in suitable bearings, the axis of which is concentric with one of the recesses in the periphery of the wheel 58 when the holding-disk is in the position of rest, and, as seen in Fig. 11, the end of the shaft extends inward into the path of the rotating wheel 58. Revolution is imparted to this shaft 59 by means of a gear, 60, fixed to the driving-shaft, which works into a like gear, 61, loose on the shaft 59, and on the shaft 59 is a fixed gear, 62, which works in frictional contact with the gear 61, and so that in its normal condition the shaft 59 will receive a constant revolution from the gear 60. Parallel with the shaft 59 is another shaft, 63, the axis of which is concentric with another recess in the periphery of the wheel 58 when the carrying-disk is in a position of rest, and, as seen in Fig. 11, the inner end of the shaft extends into the path of the revolving wheel 58. On this shaft 63 is fixed a gear, 64, like and working into the gear 62 on the shaft 59, so that the two shafts 59 and 63 receive substantially a constant revolution from the driving-shaft.

In the surface of the inner end of the shaft 59 a recess, 65, is formed, and in the surface of the inner end of the shaft 63 a recess, 66, is formed. These two recesses are of the shape shown, so that while their full surface will revolve in bearing contact with the surface of the recess in the wheel 58 the recesses will permit the teeth of the wheel to escape the said shafts.

The arrows in Fig. 11 indicate the direction of rotation of the carrying-disk and of the shafts 59 63. As represented in full lines in that figure, the shaft 63 is just on the point of escaping from the next tooth, 67, at the rear, at the same time the tooth 68 is about to pass from the shaft 59; but the shaft 63 is a little in advance of the shaft 59. So soon as the shaft 63 escapes from the path of the next advancing tooth the advance rotation of the carrying-disk may commence, and in such advancing movement the tooth 67 passes into the recess 66 of the shaft 63, and the tooth 69 next in rear of the shaft 59 will pass into the recess 65 in the shaft 59, as indicated in broken lines, Fig. 11, so that the advancing side of the recess 65 in the shaft 59 will enter the recess next in rear of the tooth 69, and the advancing side of the recess 66 of the shaft 63 will also enter the recess next in rear of the tooth 67. The shaft 59 having entered the next recess at the rear, the next advancing tooth will be stopped by coming in contact with the surface of the shaft 59, so that no advance beyond that point can occur and the carrying-disk is positively stopped; but should the advance of the carrying-disk not be fully completed the recess 66 is extended back onto the surface of the shaft to form a cam, 70, which will strike the rear side of the tooth and by its cam shape advance the carrying-disk to its proper position. By this construction and arrangement of the two shafts 59 and 63 I form dogs, the one 59 of which positively stops the advance of the disk, while the other, 63, completes the advance of the disk, should not the advancing mechanism have done so.

The frictional engagement between the gears 61 and 62 may be by an interposed material, 71, (see Fig. 12,) which will create sufficient friction to cause the gear 62 to revolve with the gear 61 under ordinary working; but if perchance there should be a positive interruption in the movement of the disk, or working of the parts whereby such movement is produced, the shafts 63 and 59, one or the other, would be brought forcibly against the next advancing tooth of the wheel 58 and cause a positive stop in the advancing devices were there no provision to the contrary; but because of the frictional engagement between the two gears 61 62 the revolution of the gear 62 will be arrested when the said frictional engagement is overcome, and the positive stopping of the shafts 59 or 63 will thus overcome the friction, and the gear 61 will continue to revolve while the advancing mechanism may stand so interrupted. Thus breakages which would otherwise occur under such interruption will be avoided. After such interruption the gears 61 and 62 must be brought again to their proper relative position, in order that the time between the operative parts of the machine may not be disturbed. This may be done by any suitable indicator or mark between the two wheels. I do not show such indicating or engaging devices, as they are too well known in the art to require description. Such indicating device may also be employed to operate a stop-motion which will disconnect the power. Such stop-motions are also numerous and too well known to require description, and constitute no essential part of my invention.

A uniformity in the head of the nail is desirable, and to attain such uniformity a predetermined quantity of metal must be presented by the projecting end of the blank. That these projecting ends may be always to the same extent, I arrange a guard, 72, above the disk, beneath which the blanks will pass on their road to the heading position. The under surface of this guard is eccentric to the disk, and gradually approaches the disk toward the holding position, as seen in Fig. 7. At the point of entrance the guard is distant from the face of the holding-dies at least the maximum length of projection of the blank from the holding-dies, and at its shortest distance from the disk it corresponds to the extent of projection required for the blank; hence as the blanks advance they pass beneath the guard and will be depressed according to their projection until before they reach the heading position they have been forced inward, and each successive blank will present to the head the same predetermined length of metal to be upset.

The feeding and cutting device may be omitted and the blanks successively introduced by hand to the disk, and, under the intermittent rotation of the disk, be successively presented to the operating mechanism.

The device which I have described for bringing the intermittently-rotating disk positively to its place of rest and positively holding it there for a predetermined space may be employed in numerous machines which require an intermittently-rotating disk of a character similar to that which I have described.

While I have particularly described the machine as for making nails from wire, it will be understood that it is equally applicable to making other articles from wire—such, for illustration, as pins, rivets, &c.

I claim—

1. A wire-feeding device consisting of the combination of a pair of grooved feed-rolls, a collar in connection with one of said rolls, and a second collar concentric with the said first collar, the adjacent faces of the two collars provided with corresponding teeth, the said teeth presenting shoulders to each other in the direction of the feed, the back of the said teeth inclined so as to escape in an opposite direction of rotation, a spirally-grooved cylinder, corresponding nut, the said cylinder and nut, the one arranged to revolve and the other to reciprocate longitudinally upon the same axis, the one rotating being in connection with the said second collar, and mechanism, substantially such as described, to impart reciprocating movement to the other, substantially as described, and whereby a backward and forward rotative movement is imparted to said second collar and a corresponding intermittent advance to the said first collar and feed-rolls.

2. The combination of the two grooved feed-rolls K L, the collar Q, fixed to one of said feed-rolls, the spirally-grooved cylinder O, carrying the collar P, corresponding to said collar Q and concentric therewith, the two collars constructed with corresponding teeth upon their adjacent faces, said teeth adapted to engage each other in one direction of revolution, but escape in the opposite direction, a reciprocating slide, S, arranged to move longitudinally over said spirally-grooved cylinder without rotation, the said slide having an extension upon its inner side into the spiral groove in the cylinder, and mechanism, substantially such as described, to impart reciprocating movement to said slide, and whereby a forward and backward movement is imparted to said cylinder and intermittent advance rotation to said rolls K L.

3. A wire cutting device consisting in the combination of two slides arranged in substantially the same line and plane and so as to be moved toward and from each other, a slide in each of the adjacent faces of the said two reciprocating slides and arranged to reciprocate in a path at right angles to the plane of the said first-mentioned slides, the said last-mentioned slides each carrying in its face corresponding parts of two dies, the said two dies arranged in position corresponding to the two extremes of reciprocating movement of the said die-carrying slides, and a guide through which the wire is presented to the said dies according to their respective positions, with mechanism, substantially such as described, to impart reciprocating movement to the said first-mentioned slides, and also reciprocating movement to the die-carrying slides at right angles to the first-mentioned slides, substantially as described.

4. The combination of the two slides $g$ $h$, arranged in guides and in substantially the same line and plane, and adapted to receive reciprocating movement toward and from each other, the slides $l$ $m$, arranged respectively in guides in the adjacent faces of the said slides $g$ $h$, and so as to be reciprocated in a path at right angles to the path of movement of the said slides $g$ $h$, each of said slides $l$ $m$ provided with corresponding parts of two pairs of wire-cutting dies, $u$ $w$, the said dies arranged relatively to each other corresponding to the extremes of reciprocating movement imparted to the said slides $l$ $m$, adjusting-screws 2 and 4, whereby the position of said slides $l$ $m$ may be adjusted, and means, substantially such as described, to impart reciprocating movement to said slides, with a spring connection, 5, between said slides $l$ $m$ and the said reciprocating mechanism, substantially as described.

5. The combination of an intermittently-rotating disk, divided holding-dies arranged in the periphery of the said disk in lateral guides, two parts of a toggle arranged each in connection with the respective parts of the holding-die and extending laterally therefrom, stationary cams arranged in the path of the free ends of the said parts of the toggle, and with which the said parts will engage under the advancing movement of the cylinder, and whereby the said holding-dies will be forced together, with a reciprocating heading-tool arranged in line with said holding dies when in the before-mentioned closed position, substantially as described.

6. The combination of the intermittently-rotating disk 6, a series of holding-dies arranged in the periphery of the said disk, each series consisting of two parts, 9 and 10, and the said parts supported in lateral guides, parts 12 13 of a toggle, respectively in connection with the said parts of each of the holding-dies, and extending laterally therefrom and so as to swing in a plane parallel with the axis of the disk, the said parts of the toggle provided with springs to yieldingly hold and return them to their normal position, stationary cams arranged in the path of the free ends of the said parts of the toggle, and so as to engage the said free ends of the toggles in advance of the disk and cause the toggles to turn under such advance movement of the disk, and thereby close the holding-dies as the disk comes to a rest, with a reciprocating heading device in line with the said holding-dies when in the said closed position of rest, substantially as described.

7. The combination of the intermittently-rotating disk 6, a series of holding-dies arranged in the periphery of said disk, each holding-die consisting of two parts, 9 and 10, in lateral guides, a toggle consisting of two parts, 12 and 13, hung, respectively, to the two parts of the holding-die extending laterally therefrom, inclined to each other, stationary cams 15 16, respectively in the path of the free ends of the said parts 12 and 13 as the disk rotates, and so that under the advance movement of the said disk and under the engagement with the said cams 15 and 16 said parts 12 and 13 will be turned into line with each other and thereby close the holding-dies, a stationary cam, 18, concentric with and upon one side of said disk, a slide, 17, arranged in said disk in a plane between each pair of dies, and guided in a path obliquely to the radial line through said holding-dies, the working-face of the said cam wedge-shaped and adapted to enter between the two parts of the said dies, with a projection from said cam slides into a corresponding groove in the said cam 18, and a reciprocating heading device in a position corresponding to the said cams, its reciprocation being in the radial line of the holding-dies when in said position of rest, substantially as described.

8. The combination of the intermittently-rotating disk having a series of holding-dies arranged in its periphery and adapted to grasp the blank introduced therein, the said disk constructed with radial cylinders 26, each in line with each of said holding-dies, a piston, 27, movable in each of said cylinders, an opening, 29, near the inner end of each of said cylinders, and a fixed induction-passage, 30, arranged to register with the said openings 29 as they are successively presented to said air-passage, substantially as described.

9. The combination of an intermittently-rotating disk, a series of holding-dies in the periphery of the said disk, each adapted to receive a blank, with mechanism, substantially such as described, to impart intermittent rotation to said disk, a wheel, 58, fixed to and concentric with said disk, and having teeth in its periphery corresponding in number to the number of holding-dies in the periphery of the disk, the recesses between the said wheel segment-shaped, the axis of said segment shape being parallel with the axis of the said wheel and disk, two shafts, 59 and 63, the axis of which respectively coincides with the axis of two of the said segment-recesses in the wheel, and the periphery of said shafts corresponding to said segment-shaped recesses, the ends of said shafts extending into said recesses in the wheel, and the said shafts constructed at their ends, respectively, with recesses 65 and 66, substantially as described, and whereby the said recessed ends of the shafts 59 and 63 form dogs to interlock with said wheel 58 and hold the said disk in its positions of rest.

10. The combination of the rotating disk 6, a series of holding-dies in the periphery of the said disk, each of the said holding-dies adapted to receive and hold a wire blank in a line radial to the axis of said disk, a gear, 34, fixed to and concentric with said disk, a shaft, 32, a fixed pinion, 33, thereon working into said gear 34, a frictional clutch on said shaft 32, one part of which is in gear-connection with the driving-shaft, and so as to receive constant rotation, the second part loose upon said shaft, free for rotation, and also free for longitudinal movement, a third part held stationary, the said second part adapted to engage either the first or third part of said clutch, a pinion, 45, fixed to said second part of the clutch, and so as to revolve therewith, a gear, 48, fixed to said shaft 32, with intermediate gears, 46 and 47, between said pinion 45 and gear 48, with mechanism, substantially such as described, to impart longitudinal movement to said second part of the clutch into engagement with either the revolving part or stationary part of the clutch, as the case may be, and mechanism to successively operate upon the said blanks in said disks, substantially as described, and whereby intermittent rotation is imparted to said disk to so successively present the blanks to said operating mechanism.

11. The combination of the rotating disk 6, mechanism, substantially such as described, to impart intermittent rotation to said disk, series of holding-dies in the periphery of said disk, each adapted to receive, hold, and transfer a wire blank, a heading device, substantially such as described, in line with each of said holding-dies as they are successively presented thereto, with a guard, 72, outside the periphery of the disk, its inner surface eccentric to the periphery of the disk and gradually approaching the disk toward the heading device, substantially as and for the purpose described.

EDWARD F. LEWIS.

Witnesses:
E. C. LEWIS,
B. H. HEMINWAY.